United States Patent [19]

Noguchi et al.

[11] 4,147,136
[45] Apr. 3, 1979

[54] FUEL REFORMING SYSTEM FOR AN INTERNAL COMBUSTION ENGINE

[75] Inventors: Masaaki Noguchi, Nagoya; Tsuchio Bunda, Okazaki; Taro Tanaka, Chiryu, all of Japan

[73] Assignee: Nippon Soken, Inc., Nishio, Japan

[21] Appl. No.: 637,413

[22] Filed: Dec. 3, 1975

[30] Foreign Application Priority Data

Dec. 6, 1974 [JP] Japan .................................. 49-140725
Jan. 13, 1975 [JP] Japan .................................. 50-6726
Jun. 11, 1975 [JP] Japan .................................. 50-71121

[51] Int. Cl.$^2$ .............................................. F02B 43/08
[52] U.S. Cl. .................................... 123/3; 123/119 E; 123/122 E
[58] Field of Search ........... 123/1 A, 3, 119 E, 122 E; 48/63; 23/281, 288 R, 288 K, 288 L; 252/373; 431/210, 215

[56] References Cited

U.S. PATENT DOCUMENTS

| | | | |
|---|---|---|---|
| 1,630,048 | 5/1927 | Balachowsky | 123/119 E |
| 2,079,632 | 5/1937 | Rector | 123/122 E |
| 2,295,209 | 9/1942 | Guiles | 123/3 |
| 3,635,200 | 1/1972 | Rundell | 123/119 E |
| 3,717,129 | 2/1973 | Fox | 123/1 A |
| 3,855,980 | 12/1974 | Weisz | 123/3 |
| 3,915,125 | 10/1975 | Henkel | 123/3 |
| 3,954,423 | 5/1976 | Hamper | 123/3 |
| 3,973,524 | 8/1976 | Rubin | 123/3 |
| 4,003,343 | 1/1977 | Lee | 123/3 |
| 4,036,180 | 7/1977 | Noguchi | 123/3 |

*Primary Examiner*—Charles J. Myhre
*Assistant Examiner*—Craig R. Feinberg
*Attorney, Agent, or Firm*—Cushman, Darby & Cushman

[57] ABSTRACT

A fuel reforming system for an internal combustion engine has a fuel reforming reactor to be supplied with a hydrocarbon fuel. The reactor contains a catalyst carrier and a catalyst thereon to be heated for facilitating a conversion of the fuel into a reformed gaseous mixture rich with hydrogen which mixture is to be fed into the engine. The catalyst is periodically alternately exposed to the fuel and air so that carbon produced and deposited on the catalyst during the fuel reforming reaction facilitated by the catalyst is burnt away from the catalyst carrier and the catalyst thereon whereby the catalytic performance of the catalyst is restored to ensure a prolonged operative life thereof. The reformed gaseous mixture assures a reliable ignition and combustion of a mixture thereof with air in the engine at a very lean air-fuel ratio to advantageously decrease the emission of harmful components of engine exhaust gas.

17 Claims, 14 Drawing Figures

FUEL REFORMING SYSTEM FOR AN INTERNAL COMBUSTION ENGINE

RELATED APPLICATION

This application is generally related to our copending application of similar title, Ser. No. 596,743, filed July 17, 1975.

BACKGROUND OF THE INVENTION

1. Field of the Invention

The present invention relates to a fuel reforming system for an internal combustion engine which system has a burner for burning a part of a hydrocarbon fuel to produce combustion gas and a fuel reforming reactor vessel to be heated by the combustion gas for converting the remainder of the fuel into a reformed gaseous mixture rich with hydrogen which mixture is to be fed into the engine to improve the ignitability and combustibility of the fuel in the engine and reduce the emission of harmful components of engine exhaust gases.

2. Description of the Prior Art

In order to solve the problem of pollution by exhaust gases from internal combustion engines, it has been required to improve the atomization of liquid fuel and the distribution of the fuel to respective engine cylinders for improved ignition and combustion of the distributed fuel. This is true with the case where a rich air-fuel mixture is supplied to a stratified charge internal combustion engine as well as with the case where a normal air-fuel mixture is fed into a conventional internal combustion engine. So as to satisfy the requirement, there has been devised an engine in which the intake system of the engine is heated by the engine exhaust gas or warmed engine cooling water so that a mixture of air and a hydrocarbon fuel is heated to 80° to 150° C. Although the fuel is atomized in the intake system, the system is not operative to reform or convert the fuel into a more easily ignitable and combustible form. Thus, there is a problem that an engine is not smoothly operable by a mixture of air and the atomized fuel at a very lean air-fuel ratio (for example, 20) and thus the supply of such a very lean air-fuel mixture to the engine does not advantageously result in the increase in the emission of the harmful components of engine exhaust gas, i.e., hydrocarbon (HC), carbon monoxide (CO) and nitrogen oxides ($NO_x$). As a fuel for an internal combustion engine is generally required to be of a high octane value, the fuel contains an amount of aromatic hydrocarbon (about 30 to 50% by volume) and an addition of lead compound. These materials are converted by the engine into harmful compounds and exhausted therefrom into the atmosphere to cause environmental pollution.

SUMMARY OF THE INVENTION

In an attempt to solve the problems discussed above, the present invention aims to bring at least a part of a hydrocarbon fuel to be fed into an internal combustion engine into contact with a heated catalyst to cause a decomposition or conversion of the fuel into a reformed gaseous mixture rich with hydrogen and having a low boiling point and a high octane value so that the reformed gaseous mixture alone or in combination with a non-reformed hydrocarbon fuel can be introduced together with air into an internal combustion engine for the improvement in the combustion of the fuel in the engine and the reduction in the emission of HC, CO and $NO_x$.

The present invention further aims to alternately expose the catalyst to the fuel for the catalytic reforming reaction thereof into the reformed gaseous mixture and to air for the removal of carbon produced and deposited on the catalyst during the reforming reaction so that the performance of the catalyst is restored, the deterioration of the catalyst due to the carbon deposit is avoided and the operative life of the catalyst is prolonged.

The fuel reforming system of the present invention includes a burner for igniting and burning a mixture of a part of a hydrocarbon fuel to be fed into an associated internal combustion engine and a part of air to be supplied to the engine to thereby produce a combustion gas of a high temperature. The combustion gas is utilized to heat a fuel reforming reaction vessel or housing and a catalyst contained therein so that the vessel or housing and the catalyst are heated immediately after the start of the engine and so that the remainder of the fuel is converted and reformed into a gaseous mixture of the character discussed above. For the appropriate reforming reaction, the reactor vessel or housing is preferably kept at a temperature ranging from 500° to 800° C. The catalyst is used to facilitate a catalytic reforming reaction so as to relieve the conditions for reaction and improve the efficiency of the conversion. Preferably, the catalyst may comprise Nickel, Chromium, Cobalt, Iron, Rhodium, Platinum and a combination of some of these metals.

As discussed, the reformed gaseous mixture produced in the reactor vessel or housing contains an amount of hydrogen. The inclusion of hydrogen in the reformed gaseous mixture facilitates a reliable ignition and combustion of a mixture of the reformed gaseous mixture with air and a non-reformed hydrocarbon fuel at such a very large (lean) air-fuel ratio that a mixture of air and a hydrocarbon fuel produced by a carburetor at the same air-fuel ratio is by no means ignitable in an engine, whereby the emission of HC, CO and $NO_x$ is greatly decreased.

The present invention further aims to remove a tar component from the reformed gaseous mixture by providing a tar separator downstream of the fuel reforming reactor vessel or housing and upstream of the associated engine. This greatly improves the distribution of the reformed mixture to engine cylinders. The tar component thus removed from the reformed gaseous mixture may advantageously be used as a fuel to be burnt in the burner to eliminate the loss otherwise caused by the removal of the tar component.

The fuel reforming system of the present invention eliminates the requirement for the addition of lead compound with the resultant elimination of the emission of the lead compound. Moreover, the reformed gaseous mixture is perfectly gasified and therefore can be more uniformly distributed into respective engine cylinders compared with a merely atomized fuel to thereby eliminate the prior art problem of irregularlity in air-fuel ratio between the respective cylinders, whereby the reduction in the emission of harmful components of engine exhaust gases is further assured.

The above and other objects, features and advantages of the invention will be made apparent by the following description with reference to the accompanying drawings.

DESCRIPTION OF PREFERRED EMBODIMENTS

Figure 1:
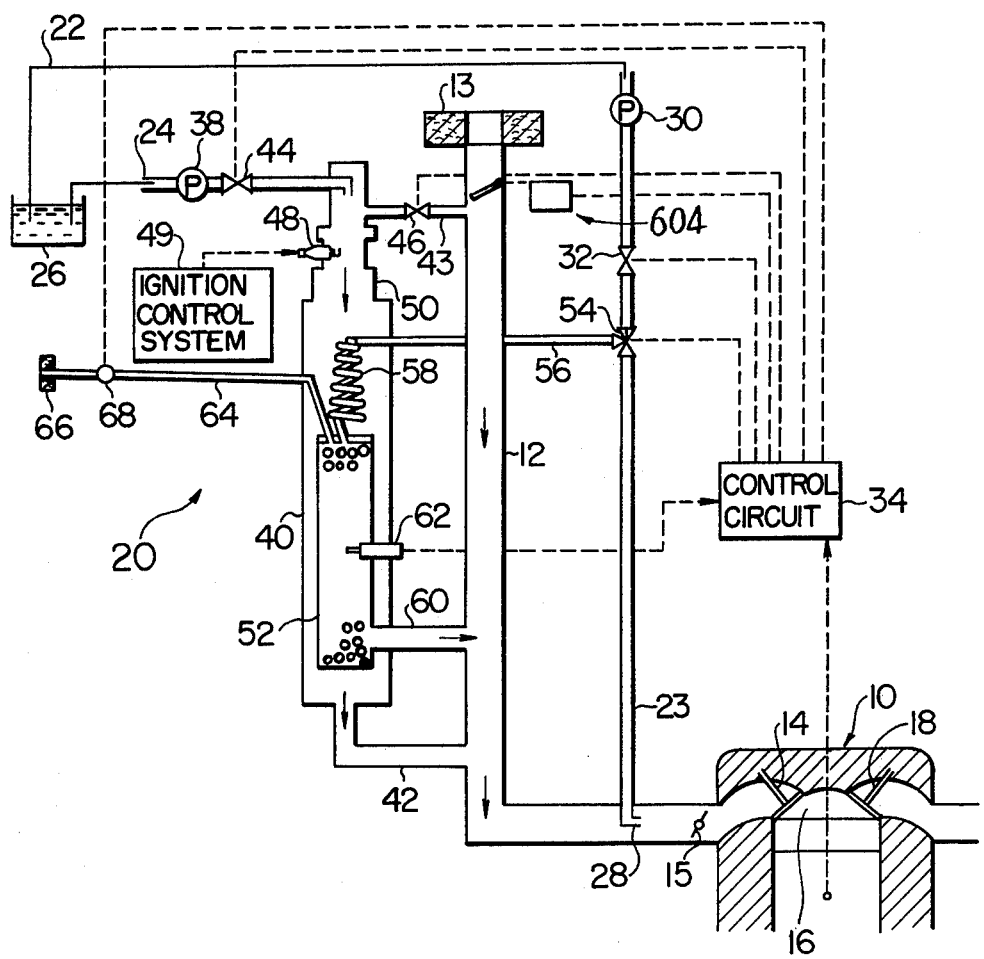
FIG. 1 is a diagrammatic illustration of a first embodiment of the fuel reforming system according to the present invention.

Referring to FIG. 1, a first embodiment of the fuel reforming system according to the present invention is generally designated by 20 and designed to be used with an internal combustion engine generally indicated by 10. The engine 10 may be a rotary piston engine, a stratified charge engine or a conventional, normal type of engine. The engine illustrated is of a type which has an intake pipe 12, an air cleaner 13 at the top of the intake pipe, an intake valve 14, a combustion chamber 16 and an exhaust valve 18. The fuel reforming system 20 includes a first and second fuel supply lines 22 and 24 connected at one ends to a fuel tank 26, respectively. A pump 30 is provided in the fuel supply line 22 to pump a hydrocarbon fuel from the tank 26 and through the line 22 at a predetermined constant pressure. Downstream of the pump 30 in the first fuel supply line 22, there is provided a metering valve 32 operative to control the flow of the fuel therethrough in accordance with the operating conditions of the engine 10. The operation of the valve 32 is controlled by signals from a control circuit 34 which is designed to receive from a conventional sensor (not shown) signals representing operating conditions of the engine. The sensor may conveniently detect the degree of opening of a throttle valve 15 of the engine 10, the rotational speed of the engine or the rate of air flow into the engine. The control circuit 34 will be described later.

The second fuel supply line 24 interconnects the fuel tank 26 and one end of an elongated enclosure 40 which in turn is connected at its other end to the intake pipe 12 of the engine by a passage 42. The enclosure 40 is also connected by a passage 43 to the intake pipe 12. The second fuel supply line 24 includes a pump 38 similar in operation to the pump 30 in the first fuel supply line 22. A fuel metering valve 44 is provided in the fuel supply line 24 downstream of the pump 38, while an air metering valve 46 is provided in the passage 43. The metering valves 44 and 46 are also controlled by signals from the control circuit 34 so that the fuel and air are introduced into the enclosure and mixed therein at an air-fuel ratio appropriate for the ignition of the mixture by a spark plug 48 mounted on the enclosure 40 and protruding thereinto adjacent to but downstream of the fuel supply line 24 and the air passage 43. The appropriate air-fuel ratio is preferably of a range from about 5 to about 15 in the case when the hydrocarbon fuel is gasoline. The spark plug 48 is electrically connected to a conventional ignition control system 49 including a breaker and an ignition coil which are not shown. The ignition of the air-fuel mixture produces a combustion gas of a high temperature which will flow downwardly toward the other end of the enclosure 40. For this reason, the part 50 of the enclosure 40 adjacent to the spark plug 48 will be called "burner".

A fuel reforming reactor vessel 52 is housed in the enclosure 40 and disposed downstream of the burner 50. The vessel 52 is filled with catalyst particles each of a pellet-like shape. Examples of the catalysts are Nickel, Chromium, Cobalt, Iron, Rhodium, Platinum and a combination of some of these metals. It will be appreciated that the combustion gas produced by the burner 50 flows downwardly in heat exchange relationship with the catalyst particles in the vessel 52 so that the particles are heated by the combustion gas.

A three-way valve 54 is provided in the first fuel supply line 22 downstream of the valve 32. A conduit 23 extends from the valve 54 to a nozzle 28 disposed in the intake pipe 12 of the engine 10 upstream of the throttle valve 15. A conduit 56 extends from the three-way valve 54 into the enclosure 40 in which the conduit 56 is connected to one end of a spiral conduit 58 the other end of which is connected to one end of the fuel reforming reactor vessel 52. The three-way valve 54 is also controlled by signals from the control circuit 34 so that the flow of the fuel through the first fuel supply line 22 can be changed-over to the conduit 56 or alternatively to the conduit 23. When the fuel from the valve 54 flows into and through the conduit 56, the fuel flows through the spiral conduit 58 in heat exchange relationship with the combustion gas from the burner 50 so that the fuel is heated and vaporized and introduced into the fuel reforming reactor vessel 52 in which the fuel is brought into contact with the heated catalyst whereby a catalytic reaction takes place to convert the fuel into a gaseous mixture which is rich with hydrogen and thus is easily ignitable by a spark plug (not shown) of the engine. The reactor vessel 52 is connected at its other end to the intake pipe 12 of the internal combustion engine 10 by a passage 60 so that the reformed gaseous mixture is fed into the intake pipe 12 upstream of the throttle valve 15 of the engine 10.

A temperature sensor 62 is mounted on the reactor vessel 52 and electrically connected to the control circuit 34 for the purpose to be made apparent later.

A second air supply line 64 extends from an air cleaner 66 and is connected to the one end of the fuel reforming reactor vessel 52, the first air supply line being the passage 43. A solenoid-operated shutoff valve 68 is provided in the second air supply line 64 and is electrically connected to the control circuit 34. The valve 68 is controlled such that air from the air cleaner 66 flows through the valve 68 into the reactor vessel 52 when the three-way valve 54 is changed-over to direct the fuel from the first fuel supply line 22 through the conduit 23 to the nozzle 28 and directly into the intake pipe 12, i.e., when the fuel from the first fuel supply line 22 bypasses the fuel reforming reactor vessel 52.

Figure 2:
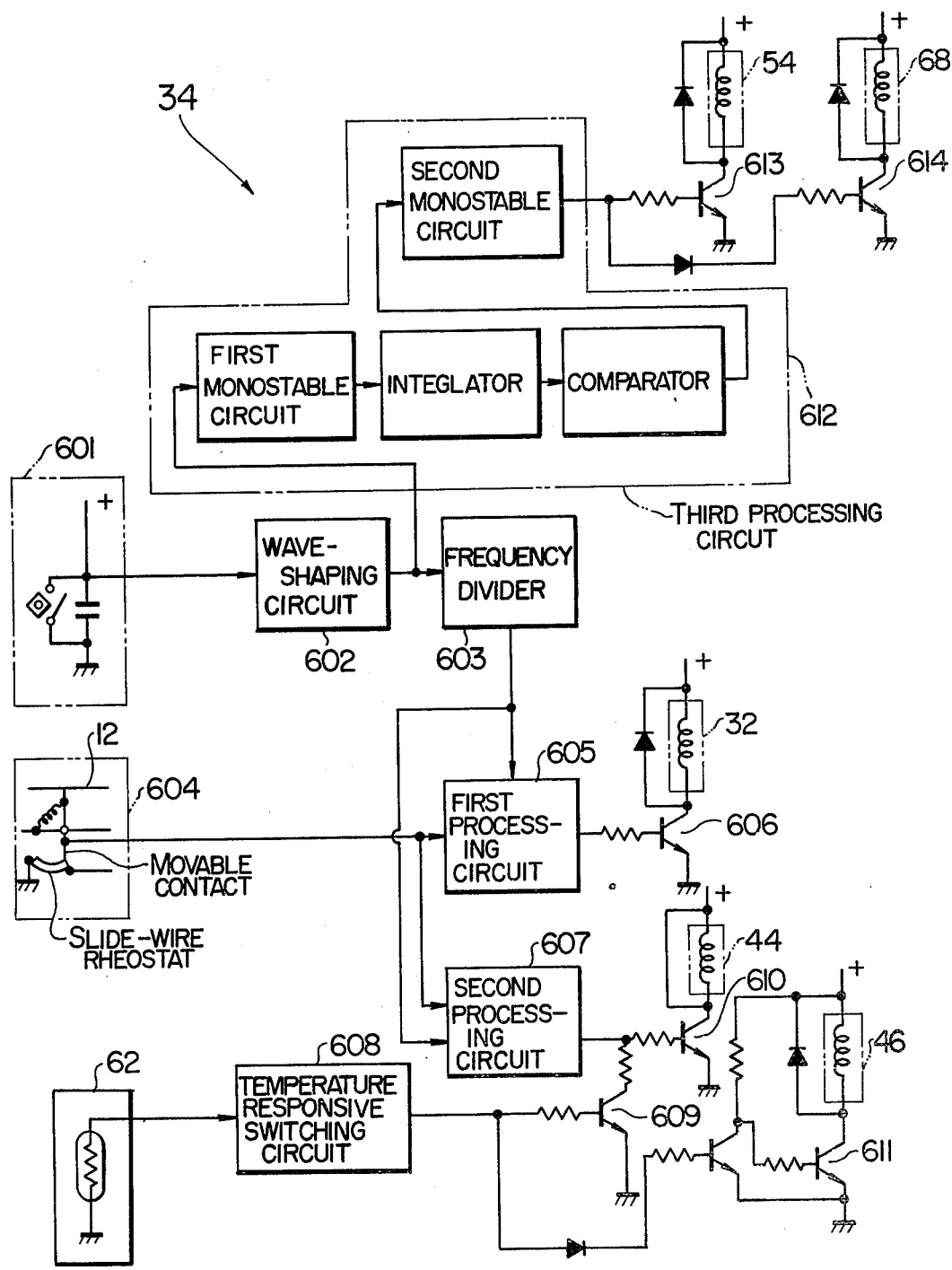
FIG. 2 is a block diagram of a control circuit shown in FIG. 1.

Referring to FIG. 2, the control circuit 34 shown in FIG. 1 includes a reference signal generator 601 generating reference signals in synchronism with the rotation of the engine 10. In the illustrated embodiment of the invention, the generator 601 is in the form of a contact breaker. The signals generated by the generator 601 are received and shaped by a waveshaping circuit 602. A frequency divider 603 divides the frequency of the output signals from the waveshaping circuit 602.

An air-flow meter 604 is mounted on the intake pipe 12 of the engine 10 to detect the flow of air into the engine. The air-flow meter 604 may be any conventional air-flow meter such as one employed in an electro-controlled fuel injection system for an internal combustion engine. A first processing circuit 605 receives the output signals from the frequency divider 603 and from the air-flow meter 604 to calculate the opening and closing timing for the valve 32 which controls the flow of fuel to be introduced into the reforming reactor vessel 52. The processing circuit 605 emits pulsated control signals in response to which a power transistor 606 is operative to open and close the valve 32.

A second processing circuit 607 also receives output signals from the frequency divider 603 and the air-flow meter 604 to calculate the opening and closing timing for the valve 44 which controls the flow of fuel to be fed into the burner 50. A temperature responsive switching circuit 608 is operative in response to signals from the temperature sensor 62 mounted on the reforming reactor vessel 52 to generate "H" and "L" level signals, the "H" level signals being generated when the signals from the temperature sensor 62 represent that the temperature in the reforming reactor vessel is higher than a predetermined temperature while the "L" level signals are generated when the signals from the temperature sensor 62 represent that the temperature in the vessel 52 is lower than the predetermined level. A transistor 609 is operative to interrupt the transmission of the output signals from the second processing circuit 607 to a power transistor 610 when the transistor 609 receives a "H" level signal from the temperature responsive switching circuit 608. The power transistor 610 is operative in response to signals from the second processing circuit 607 to control the valve 44 when the transistor 609 is in its "OFF" state. A transistor 611 is rendered nonconductive by the "H" level signal from the temperature responsive switching circuit 608 to close the valve 46 in the passage 43.

A third processing circuit 612 is operative in response to the signals from the waveshaping circuit 602 to actuate the valves 54 and 68 and comprises a first monostable circuit, an integrating circuit for performing D-A conversion of signals from the first monostable circuit, a comparing circuit operative to decide as to whether or not the engine speed is higher than a predetermined speed thereby for emitting "H" and "L" level signals when the engine speed is higher and lower than the predetermined speed, respectively, and a second monostable circuit operative to decide the length of a "H" level signal from the comparing circuit.

A power transistor 613 is operatie in response to signals from the third processing circuit 612 to control the valve 54 so that the first fuel supply line 22 is communicated with the conduit 23 when the transistor 613 receives a "H" level signal from the third processing circuit 612. A further power transistor 614 is also operative in response to signals from the third processing circuit 612 to control the valve 68 in the second air supply line 64.

With the above-described construction and arrangement of the fuel reforming system 20, when the engine 10 is operated, the control circuit 34 receives signals which represent the operating condition of the engine to vary the ratio of the period of time while the metering valve 32 is open relative to the period of time while the valve is closed for thereby controlling the flow of the hydrocarbon fuel pumped from the fuel tank 26 to the fuel reforming reactor vessel 52 through the change-over valve 54. The control circuit 34 is also operative to control the fuel and air metering valves 44 and 46 so that the fuel and air are supplied to the burner 50 at a controlled ratio. A mixture of the fuel and air is ignited by the spark plug 48 and burnt in the burner to produce a combustion gas of a high temperature. The ignition by the spark plug is controlled by the ignition control circuit 49. The combustion gas thus produced flows in the enclosure 40 toward the reactor vessel 52 in heat exchange relationship with the fuel flowing through the spiral conduit 58 in the enclosure 40 so that the fuel from the first fuel supply line 22 is heated to a temperature high enough to vaporize the fuel during the passage thereof through the spiral conduit 58. The atomized fuel is introduced into the fuel reforming reactor vessel 52. At this time, the valve 68 is closed by the control circuit 34 so that no air flows from the air cleaner 66 into the vessel 52. The catalyst in the vessel 52 is also heated by the combustion gas from the burner 50 so that the catalyst is kept active to facilitate a catalytic reforming reaction of the atomized fuel, so that the fuel is converted into a reformed gaseous mixture which can effectively be ignited and burnt in the engine 10.

As the rate of flow of the fuel to the fuel reforming reactor vessel 52 is continuously varied by the metering valve 32 in accordance with the varying operating conditions of the engine 10, the temperature in the reactor vessel 52 is advantageously controlled. For this purpose, the control circuit 34 receives signals from the temperature sensor 62 mounted on the reactor vessel 52. The temperature responsive switching circuit 608 and the transistors 609, 610 and 611 of the control circuit 34 are operative to control the metering valves 44 and 46 so that the fuel and air are fed to the burner 50 at rates required for the combustion therein. In other words, the temperature in the fuel reforming reactor vessel 52 is controlled by virtue of the rate of the combustion in the burner. Thus, the fuel from the first fuel supply line 22 is converted into the reformed, effectively combustible gaseous mixture which is then discharged from the reactor vessel 52 through the passage 60 into the intake pipe 12 of the engine and is mixed with the air from the air cleaner 13 to form an air-fuel mixture at an appropriate air-fuel ratio which in turn is fed into the combustion chamber 16 in the engine 10.

The catalyst in the vessel 52 is heated by the combustion gas from the burner 50 to a temperature ranging normally from 500° to 800° C. to reform the fuel from the first fuel supply line 22 into the gaseous mixture which is rich with hydrogen. Namely, the fuel is dissolved to produce hydrogen. At this time, the carbon content in the fuel is educed and deposited on the surface of the catalyst. It has been found that the deposition of carbon is increased as the system is operated, so that the performance of the catalyst is decreased. In the illustrated embodiment of the invention, therefore, the supply of fuel into the fuel reforming reactor vessel 52 is stopped at a time when the engine does not produce a large amount of nitrogen oxides, such as during idle operation of the engine. Thus, the fuel from the first fuel supply line 22 is caused to flow through the fuel conduit 23 and injected from the nozzle 28 into the intake pipe 12 of the engine. At this time, the reactor vessel 52 is supplied with air to produce a combustion reaction between the air and the carbon deposited on the catalyst. More specifically, when the engine 10 is operated at a low speed at which the engine does not produce a large amount of $NO_x$, such as in idle operation of the engine, the control circuit 34 causes the change-over valve 54 to communicate the first fuel supply line 22 with the fuel conduit 23 for a period of time from the time the speed of the engine 10 becomes lower than a predetermined speed. At the same time, the control circuit 34 operates to open the valve 68 to supply air from the air cleaner into the reactor vessel 52. At the same time, the catalyst in the vessel 52 is at a high temperature such as 800° C. because the catalyst is heated by the combustion gas from the burner 50. Thus, the carbon deposited on the catalyst is oxidized by the air supplied into the vessel 52 to produce carbon monoxide and carbon dioxide which are discharged from the vessel 52 into the intake pipe 12 through the passage 60. Thus, the carbon deposit on the catalyst is effectively removed therefrom to recover the performance of the catalyst. The combustion gas discharged from the vessel 52 through the passage 60 into the intake pipe 12 is mixed with the air from the air cleaner 13 and with the combustion gas from the enclosure 40 (i.e., from the burner 50) to form a mixture into which the fuel from the fuel conduit 23 is injected to form a composite mixture which is appropriate for combustion in the engine 10.

After the lapse of a predetermined period of time, i.e., after the carbon deposite is completely removed from the catalyst, the control circuit 34 actuates the change-over valve 54 and the shut-off valve 68 so that fuel from the first fuel supply line 22 is introduced into the reactor vessel 52 while the supply of air from the air cleaner 66 to the vessel 52 is stopped, whereby the vessel 52 resumes its fuel reforming operation.

The reformed gaseous mixture thus obtained contains a large amount of hydrogen and thus can be fed with the air from the air cleaner 13 into the engine at a very lean air-fuel ratio and stably ignited and burnt in the engine 10, whereby the emission of the three important harmful components of the engine exhaust gas, i.e., HC, CO and $NO_x$, is greatly reduced and the operative life of the catalyst is greatly increased. It will be appreciated that an air-fuel mixture produced by a conventional carburetor at the same, very lean air-fuel ratio will not be stably ignitable and combustible in the conventional internal combustion engine because the mixture is not reformed into a gaseous mixture rich with hydrogen.

Figure 3:
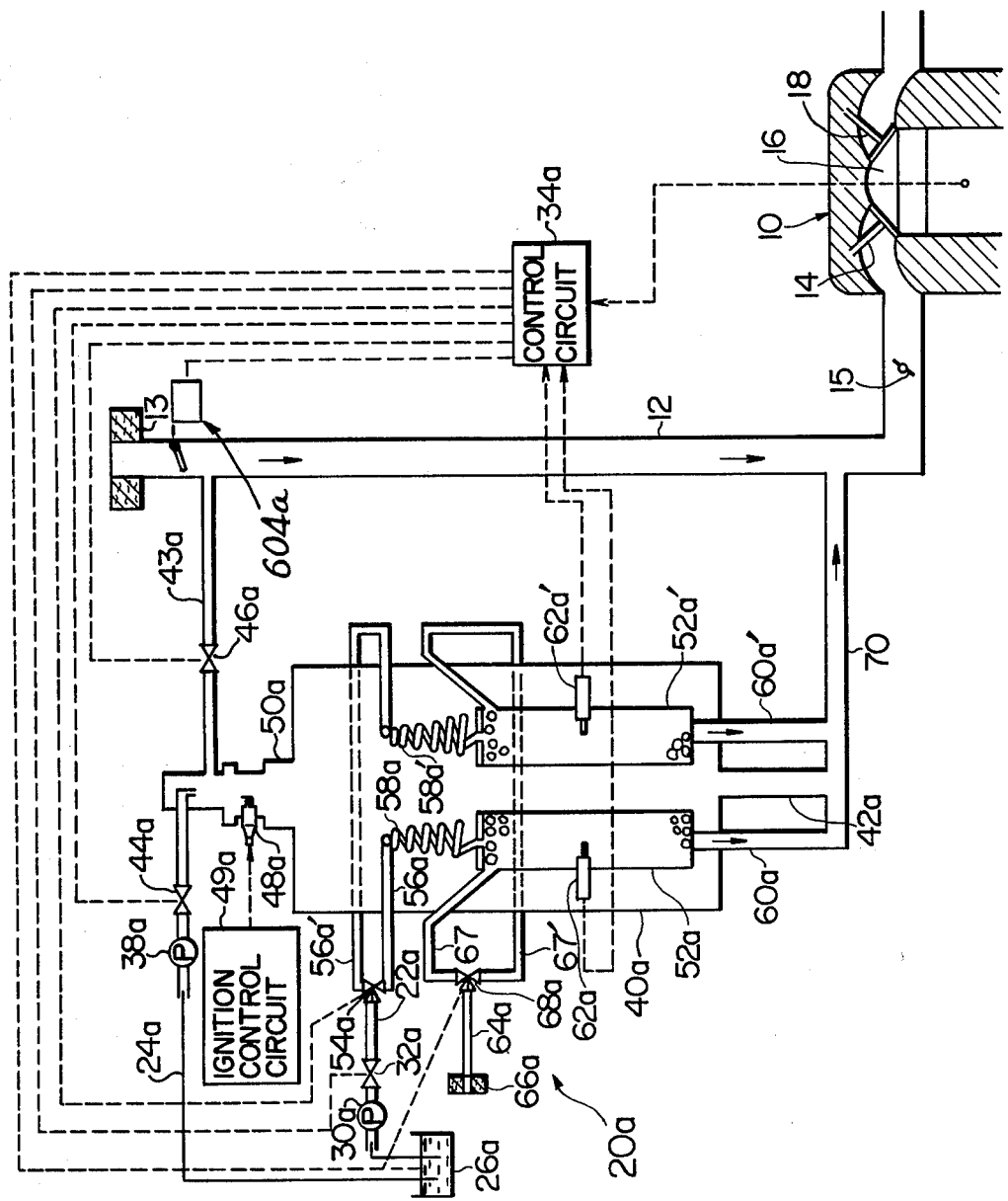
FIG. 3 is a diagrammatic illustration of a second embodiment of the invention.

FIG. 3 illustrates a second embodiment of the invention generally designated by 20a. The parts of the second embodiment similar to those of the first embodiment are indicated by similar reference numerals followed by a character "a". The difference of the second embodiment from the first embodiment will be mainly described hereunder.

The fuel reforming system of the second embodiment 20a comprises a pair of fuel reforming reactor vessels 52a and 52a' housed in a single enclosure 40a and arranged in parallel relationship with each other. The reactor vessels 52a and 52a' are designed to be alternately brought into fuel reforming operation so that when one of the vessels (52a) is supplied with fuel for the conversion thereof into a reformed gaseous mixture rich with hydrogen, the other vessel (52a') is supplied with air for the removal of a carbon deposited on the catalyst during the preceding fuel reforming operation of the vessel 52a', and vice versa. In other words, the operation of each of the reactor vessels 52a and 52a' is periodically changed into fuel reforming operation and carbon removing operation so that the fuel reforming system 20a continuously produces a reformed gaseous mixture to be supplied into an internal combustion engine 10. The construction and operation of each of the reactor vessels 52a and 52a' are substantially similar to those of the reactor vessel 52 of the first embodiment. Thus, any further description in this concern will not be required.

The enclosure 40a is substantially similar in construction and operation to the enclosure 40 of the first embodiment with the exception that the enclosure 40a is somewhat larger than the enclosure 40 so as to accommodate the two vessels 52a and 52a' therein. A burner 50a is positioned at the upstream end of the enclosure 40a and supplied with fuel and air from a second fuel supply line 24a and first air supply line 43a to produce a combustion gas as in the first embodiment. Fuel and air metering valves 44a and 46a are provided in the fuel and air lines 24a and 43a, respectively, which are controlled by a control circuit 34a, as in the first embodiment.

A first fuel supply line 22a is provided therein with a fuel metering valve 32a to be controlled by the control circuit 34a as in the first embodiment. The fuel supply line 22a is divided by a three-way valve 54a into two branches 56a and 56a' which extend into the enclosure 40a and are connected to spiral conduits 58a and 58a' disposed in the enclosure 40a downstream of the burner 50a. The spiral conduits are connected to the reactor vessels 52a and 52a', respectively. The three-way valve 54a is controlled by the control circuit 34a so that when the fuel from a fuel tank 26a flows through one of the branches (56a) into the vessel 52a, no fuel is supplied through the other branch (56a') into the other vessel 52a' and vice versa.

A second air supply line 64a is divided by a three-way valve 68a into two branches 67 and 67' which extend into the enclosure 40a and are connected to the vessels 52a and 52a', respectively. The three-way valve 68a is also controlled by the control circuit 34a so that air from an air cleaner 66a is supplied into one of the reactor vessels to which no fuel is being supplied from the fuel supply line 22a.

The enclosure 40a is connected at its downstream end to a passage 42a which is connected by a passage 70 to an air intake pipe 12 of the engine 10. The two fuel reforming reactor vessels 52a and 52a' are connected to the passage 70 by passages 60a and 60a', respectively, so that the reformed gaseous mixture and the combustion gas (including carbon monoxide and carbon dioxide) produced in the reactor vessels 52a and 52a' are mixed in the passage 70 with the combustion gas from the burner 50a and fed into the intake pipe 12 of the engine 10.

Temperature sensors 62a and 62a' are mounted on the reactor vessels 52a and 52a' and electrically connected to the control circuit 34a.

Figure 4:
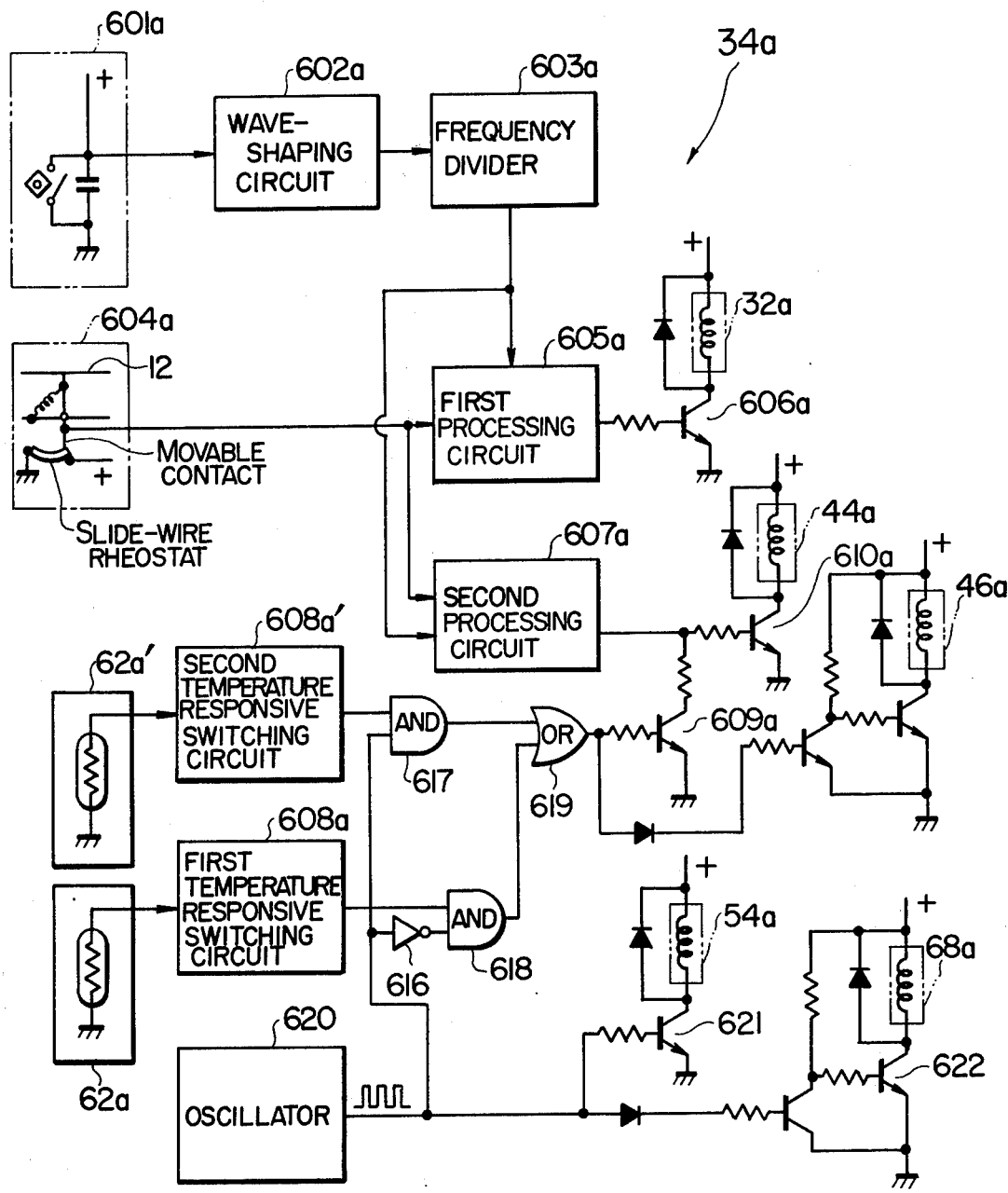
FIG. 4 is a block diagram of a control circuit shown in FIG. 3.

FIG. 4 illustrates in block diagram the control circuit 34a of the fuel reforming system 20a. The circuit 34a is similar in part to the control circuit 34 of the first embodiment of the invention. Similar parts are indicated by similar reference numerals followed by a character "a". The difference will be described hereunder.

First and second temperature responsive switching circuits 608a and 608a' are similar in construction and operation to the temperature responsive switching circuit 608 of the first embodiment and electrically connected to the temperature sensors 62a and 62a', respectively. Reference numeral 616 indicates an inverter for inverting signals. Reference numerals 617 and 618 designate AND gates, respectively. Reference numeral 619 indicates an OR gate. These elements constitute a control logical circuit for controlling the valves 44a and 46a.

An oscillator 620 comprises a conventional astable multivibrator. Power transistors 621 and 622 are operative in response to signals from the oscillator 620 to control the three-way valves 54a and 68a.

The three-way valves 54a and 68a are thus controlled in accordance with signals generated by the oscillator 620 so that the fuel and air supply lines to the reactor vessels 52a and 52a' are rapidly changed-over at predetermined time intervals. When both reactor vessels 52a and 52a' are at a temperature lower than a predetermined temperature, the first and second temperature responsive switching circuits 608a and 608a' generate "L" level signals with the result that the AND gates 617 and 618 emit "L" level output signals. Consequently, the OR gate 619 also emits an "L" level output signal, so that a transistor 609a is rendered non-conductive. Accordingly, a transistor 610a is controlled by signals from a second processing circuit 607a with the result that the fuel metering valve 44a is controlled by signals from sensors 601a and 604a.

When the fuel reforming reactor vessel 52a is in fuel reforming operation, namely, when the AND gate 618 receives an "H" level signal from the oscillator 620 through the inventor 616, the first temperature responsive switching circuit 608a emits an "H" level signal if the temperature in the vessel 52a is extraordinarily elevated, so that the AND gate 618 emits an "H" level signal. Consequently, the OR gate 619 emits an "H" level signal to render the transistors 610a and 611a non-conductive with the result that the fuel and air metering valves 44a and 46a are both closed to stop the supply of fuel and air to the burner 50a. Similarly, the supply of fuel and air respectively from the fuel line 24a and the air line 43a to the burner 50a is stopped when the temperature of the other fuel reforming reactor vessel 52a is extraordinarily elevated. This feature of the invention prevents catalysts in the reactor vessels 52a and 52a' from being exposed to the extraordinarily elevated temperature long time and thus deteriorated by the elevated temperature.

Figure 5A:
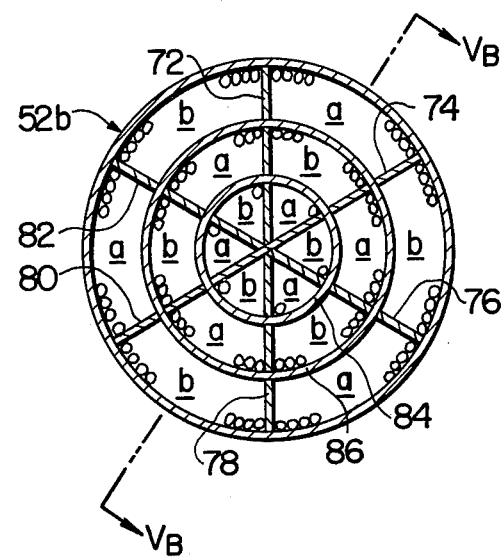
FIG. 5A is a cross-section of a fuel reforming reactor vessel of a third embodiment of the invention taken along line VA—VA in FIG. 5B.
Figure 5B:
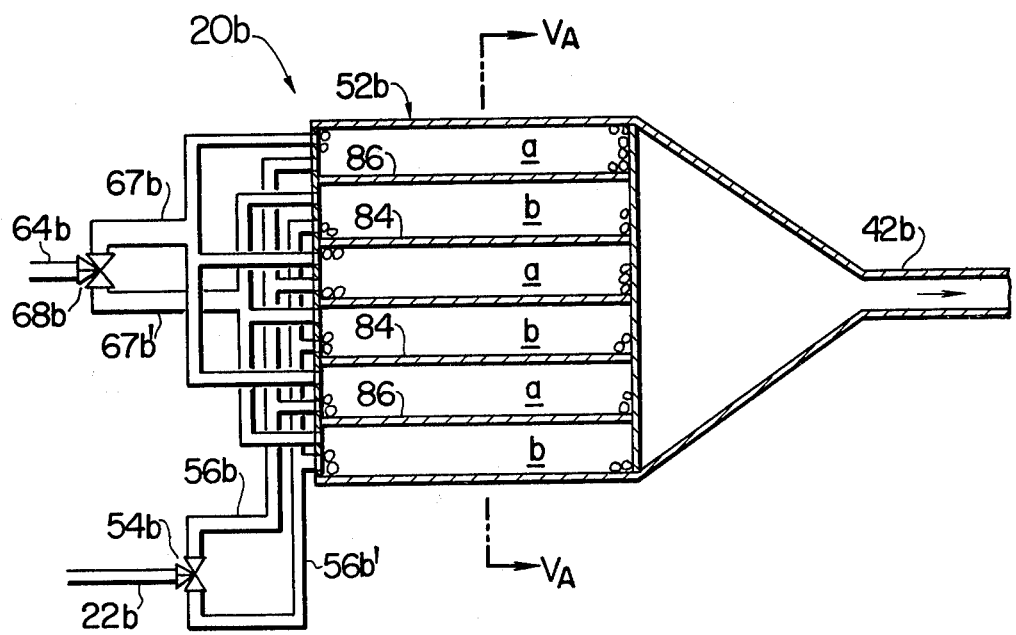
FIG. 5B is a partially diagrammatic, axial sectional view of the reactor vessel shown in FIG. 5A taken along line VB—VB therein.

FIGS. 5A and 5B illustrate a third embodiment of the invention generally designated by 20b. The embodiment includes a generally cylindrical fuel reforming reactor vessel 52b, the interior of which is divided into a plurality of chambers by a plurality of radially and axially extending partitions 72, 74, 76, 78, 80 and 82 and cylindrical partitions 84 and 86 disposed concentrically with respect to each other and with respect to the vessel 52b. Each of the chambers thus defined in the vessel 52b is filled with catalyst particles. The chambers are classified into first and second groups marked "a" and "b", respectively, and arranged such that each of the chambers of the first group "a" is adjacent to at least one of the chambers of the second group "b". The radial and cylindrical partitions 72 to 86 are made of a heat-conductive material so that the chambers "a" and "b" are in heat exchange relationship with each other. The vessel 52b is housed in an enclosure (not shown) which may be similar to the enclosure 40 of the first embodiment or to the enclosure 40a of the second embodiment.

Referring particularly to FIG. 5B, a fuel supply line 22b extending from a fuel tank (not shown) is divided by a three-way valve 54b into two branches 56b and 56b'. The branch 56b is further branched and connected to the first group of chambers marked "a", whereas the branch 56a' is further branched and connected to the second group of chambers marked "b". A fuel metering valve (not shown) is provided in the fuel supply line 22b upstream of the three-way valve 54b as in the second embodiment. The not-shown valve and the valve 54b may be controlled by a control circuit (not shown) which may be similar to the control circuit 34a of the second embodiment.

An air supply line 64b from an air cleaner (not shown) is divided by a three-way valve 68b into two branches 67b and 67b'. The branch 67b is further branched and connected to the first group of chambers marked "a", whereas the other branch 67b' is further branched and connected to the second group of chambers marked "b". An air metering valve (not shown) is provided in the air supply line 64b upstream of the three-way valve 68b as in the second embodiment. The not-shown valve and the three-way valve 68b may be controlled by the not-shown control circuit as in the second embodiment.

In operation, the three-way valves 54b and 68b are controlled such that when the fuel from the fuel supply line 64b is supplied into one of the two groups of chambers (for example, the group "a") for the conversion of the supplied fuel into a reformed gaseous mixture rich with hydrogen, as discussed above, the other group ("b") of chambers is supplied with the air from the air supply line 22b and vice versa. The carbon deposited on the catalyst particles in said the other group of chambers ("b") during the preceding fuel reforming operation of this group of chambers is burnt by the supplied air to produce a combustion gas of a high temperature. The heat thus produced is transmitted to the catalyst particles in said one group of chambers ("a") to effectively heat the catalyst particles. This economically reduces the fuel to be burnt in a burner (not shown) so as to heat the vessel 52b. From the above description, it will be appreciated that the first and second groups of chambers "a" and "b" correspond in function to the reactor vessels 52a and 52a' of the second embodiment. The reformed gaseous mixture and the combustion gas thus produced in the reactor vessel 52b are gathered together and discharged there from through an outlet passage 42b into an intake pipe (not shown) of an internal combustion engine (not shown) as in the preceding embodiments.

Figure 6:
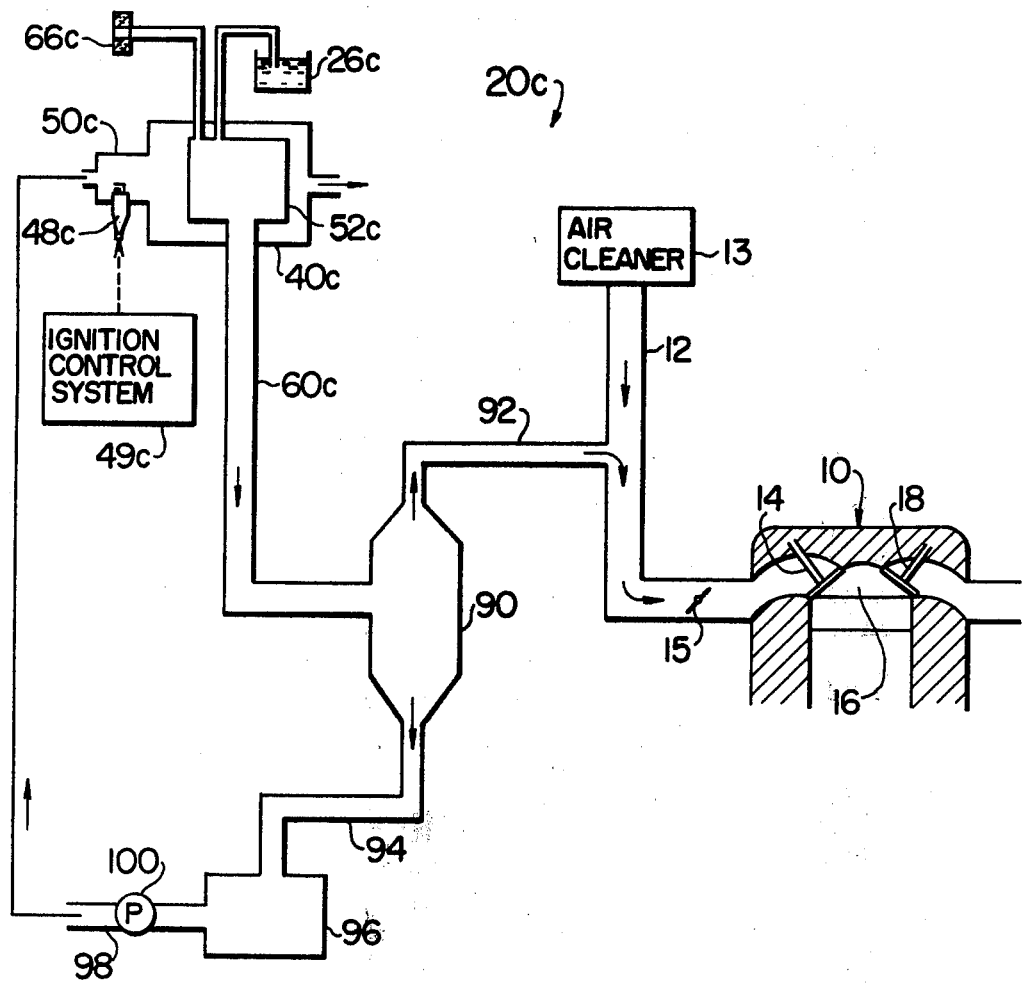
FIG. 6 is a diagrammatic illustration of a fourth embodiment of the invention.

FIG. 6 illustrates a fourth embodiment of the invention generally designated by 20c. The embodiment is characterized by the provision of a separator disposed between a fuel reforming reactor vessel and an intake pipe of an engine to separate a tar component from a reformed gaseous mixture produced in the reactor vessel so that the rest of the reformed gaseous mixture is fed to the engine in completely gaseous condition, whereby the distribution of the reformed gaseous mixture to respective engine cylinders is improved and the emission of harmful components of the engine exhaust gas is reduced.

The fuel reforming system 20c of the embodiment comprises a fuel reforming reactor vessel 52c which may be similar in construction and function to anyone of the fuel reforming reactor vessels of the preceding embodiments. The reactor vessel 52c is housed in an enclosure 40c having a burner 50c disposed upstream of the reactor vessel 52c. A spark plug 48c is mounted on the burner 50c and energized by an ignition control circuit 49c as in the preceding embodiments. The reactor vessel 52c is designed to be supplied with fuel and air from a fuel tank 26c and air cleaner 66c. Fuel and air metering valves (not shown) may be provided in the fuel and air supply lines, respectively, and controlled by a control circuit (not shown) as in the preceding embodiments.

The reactor vessel 52c is connected to the tar separator 90 having an upper end connected to the intake pipe 12 of the engine 10 by a passage 92. The lower end of the separator 90 is connected by a passage 94 to a reservoir 96 which in turn is connected to the burner 50c by a return passage 98. A pump 100 is provided in the return passage 98.

In operation, the fuel reforming reactor vessel 52c produces a reformed gaseous mixture rich with hydrogen, as in the preceding embodiments. The mixture thus produced is discharged at a relatively high temperature from the vessel 52c and introduced into the separator 90 in which the relatively heavy tar component of the mixture is separated and flows downwards into the passage and thus into the reservoir 96, while the rest of the reformed gaseous mixture is sucked into the engine 10 through the passage 92 and the intake pipe 12. The tar component is pumped by the pump 100 from the reservoir 96 to the burner 50c and burnt therein to produce heat. Thus, the separation of the tar component does not cause any energy loss. Of course, the burner 50c may be supplied with an additional fuel through a fuel supply line (not shown) if the combustion of the tar component in the burner does not produce sufficient heat to activate a catalyst in the reactor vessel 52c.

In the embodiment described, the combustion gases produced in the burner are all introduced into engine. However, the burner may be operated in such a manner that excess oxygen is supplied to the fuel so that a combustion gas comprises carbon dioxide and water. The combustion gas or a part thereof may be introduced into an exhaust pipe of the engine.

In the second and third embodiments, the combustion gases produced by the combustion of the carbon deposits are introduced into associated engines together with reformed gaseous mixtures. However, the carbon deposits may be supplied with excess oxygen to produce carbon dioxide which can be introduced into the exhaust pipes of the engines.

In the described and illustrated embodiments of the invention, the fuel reforming reactor vessels are supplied with a hydrocarbon fuel only. However, either a rich mixture of a hydrocarbon fuel and air or a mixture of a hydrocarbon fuel and a combustion gas produced in a burner may alternatively be fed into a fuel reforming reactor vessel.

In the second and third embodiments of the invention, the reformed gaseous mixture is always produced and introduced into engines. In the first embodiment of the invention, the engine is operated solely with the reformed gaseous mixture for certain periods of time. However, it will be apparent to those skilled in the art that the engine may be provided with a carburetor in addition to the fuel reforming system of the invention so that the engine is supplied with a composite mixture of a non-reformed fuel, a reformed gaseous mixture and air. The hydrogen content in the composite mixture may be varied with the different operating conditions of the engine.

Figure 7:
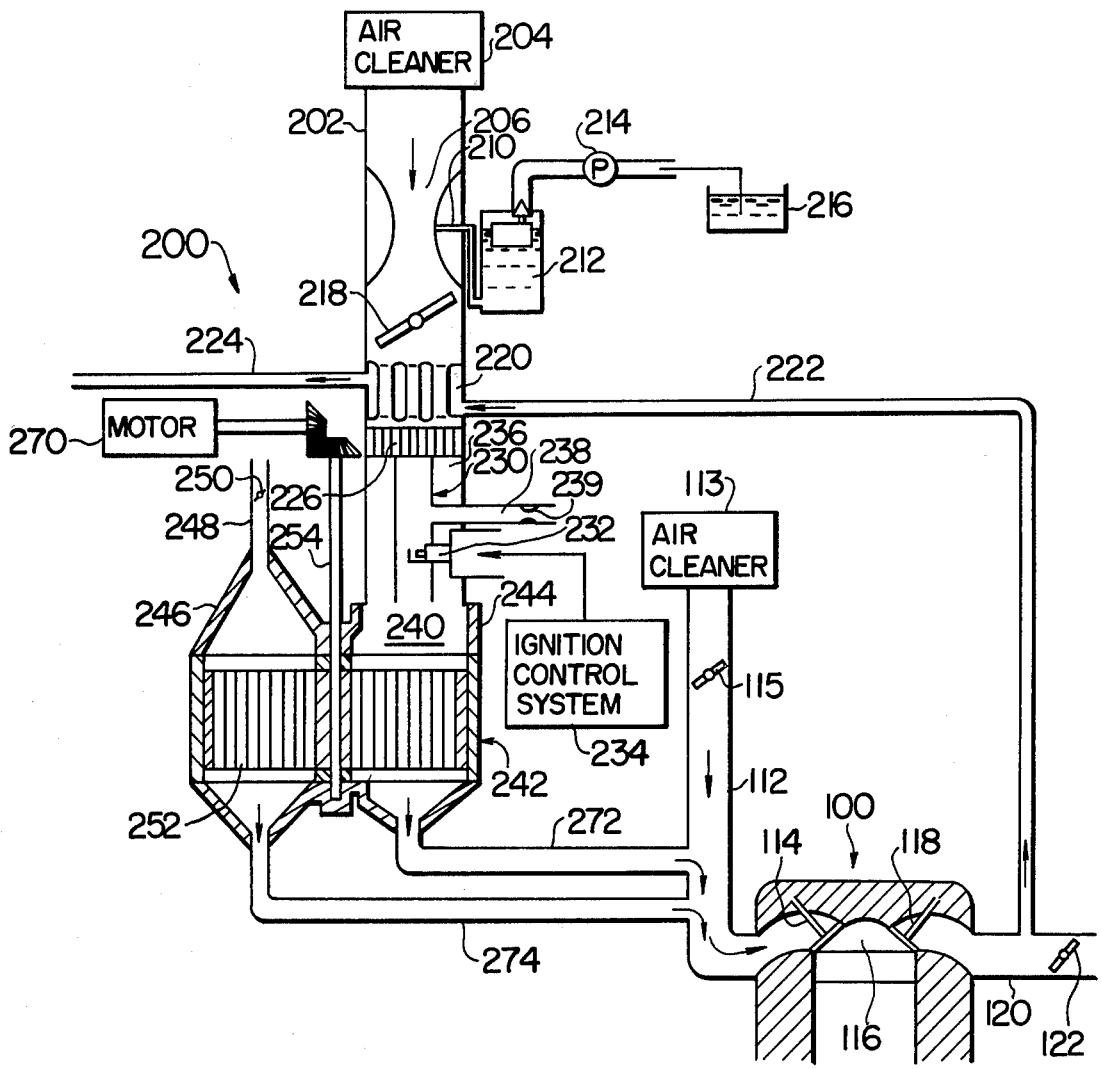
FIG. 7 is a diagrammatic illustration of a fifth embodiment of the invention.

FIG. 7 illustrates a fifth embodiment of the fuel reforming system of the invention generally designated by 200 and designed to be used with an internal combustion engine 100 which includes an air intake pipe 112, an air cleaner 113, an intake valve 114, a throttle valve 115, a combustion chamber 116, an exhaust valve 118 and an exhaust pipe 120. A flap valve 122 may preferably be provided in the exhaust pipe 120 to restrict the flow of engine exhaust gas therethrough.

The fuel reforming system 200 includes an intake tube 202 connected at its upstream end with an air cleaner 204. The intake tube 202 is formed therein with venturi 206 through which air from the cleaner 204 flows and into which hydrocarbon fuel is jetted by a nozzle 210 so that a rich air-fuel mixture is produced. The nozzle 210 extends from a float chamber 212 to which the fuel is supplied by a pump 214 from a fuel tank 216. A throttle valve 218 is provided in the intake tube 202 downstream of the venturi 206 to control the flow of an air-fuel mixture produced in the venturi 206.

A heat exchanger 220 is disposed in the intake tube downstream of the throttle valve 218 and defines therein two groups of passages, one of which groups comprises a plurality of axial passages through which the air-fuel mixture flows. The other group comprises substantially transverse passages connected to one end of a pipe line 222 which is connected at the other end to the exhaust pipe 120 of the engine 100 upstream of the flap valve 122. Because the valve 122 restricts the flow of the engine exhaust gas through the exhaust pipe 120, a part of the engine exhaust gas flows through the pipe line 222 and through the heat exchanger 220 into an outlet pipe 224 so that the air-fuel mixture flowing through the heat exchanger 220 is heated. The outlet pipe 224 may be connected to the exhaust pipe 120 of the engine downstream of the flap valve 122.

A tubular burner 230 is disposed substantially concentrically in the intake tube 202 downstream of the heat exchanger 220 and provided with a spark plug 232 protruding into the burner and adapted to produce spark discharge. A conventional ignition control system 234 is electrically connected to the spark plug 232. The burner 230 has a diameter smaller than that of the intake tube 202 so that only a part of the rich air-fuel mixture from the heat exchanger 220 is introduced into the burner 230 and the remainder of the air-fuel mixture flows through an annular passage 236 defined between the inner and outer peripheral surfaces of the intake tube 202 and of the burner 230. A secondary air supply pipe 238 having an air-flow restricter 239 therein is connected to the burner 230 to supply secondary air at a rate controlled by the restricter. The arrangement is such that the rich air-fuel mixture flowing into the burner is diluted by the secondary air to an air-fuel ratio which is appriate for the mixture to be ignited by the spark plug 232 to thereby produce a combustion gas in the burner 230. A flame arrester made of a wire netting or a perforated plate of ceramic material extends across the intake tube 202 between the heat exchanger 220 and the burner 230 to prevent backfire.

A generally cylindrical housing 242 is disposed downstream of the bottom end of the intake tube 202 and has an open end the area of which is divided into two generally semi-circular sections to one of which the bottom end of the intake tube 202 is connected by a generally semi-circular sealing wall 244 which defines therein a mixing chamber 240. The combustion gas produced by the burner 230 and the unburnt, rich air-fuel mixture passing through the annular passage 236 flow into the mixing chamber 240 and are mixed together therein to form a composite gaseous mixture. The other generally semi-circular section is connected by a second sealing wall 246 to an air inlet pipe 248 in which a flap valve 250 is provided to control the flow of air through the pipe 248.

A generally cylindrical or disc-like catalyst carrier 252 is substantially snugly received in the housing 242 and has an axle 254 rigidly secured to the catalyst carrier. The axle 254 is drivingly connected to a motor 270 so that the axle is rotated thereby together with the catalyst carrier 252 at a speed of 1/5–10 r.p.m.

Figure 8:
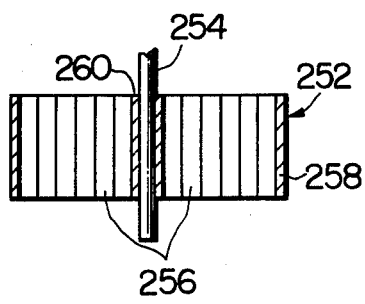
FIGS. 8 and 9 are axial and cross-sectional views of a catalyst carrier shown in FIG. 7, respectively.
Figure 9:
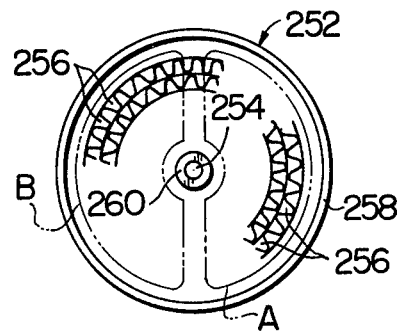

Referring to FIGS. 8 and 9, the catalyst carrier 252 has a honeycomb structure formed of sheets of a heat and corrosion-resistant material such as almina or mullite. The honeycomb structure defines a plurality of axial passages 256 the walls of which carry a catalyst, such as Ni, Cr, Co, Pt, Rh and a combination of some of these materials. The periphery of the honeycomb structure is reinforced by a circumferential frame 258, while the central part of the structure is provided with a central reinforcement 260 by means of which the honeycomb structure is secured to the axle 254. The characters "A" and "B" in FIG. 9 indicate two generally semi-circular regions of the catalyst carrier 252 which are exposed at a moment to the composite mixture in the mixing chamber 240 and to the air from the air inlet pipe 248.

Referring agin to FIG. 7, the composite mixture formed in the mixing chamber 240 is introduced into the axial passages in a generally semi-circular region of the catalyst carrier 252 and converted into a reformed gaseous mixture by a reforming reaction due to a thermal decomposition and/or steam-reformation of the composite mixture facilitated by the catalyst. The reformed gaseous mixture is discharged from the housing 242 through a passage and introduced into the intake pipe 112 of the engine 100 at a position of the intake pipe 112 downstream of the throttle valve 115.

As the catalyst carrier 252 is rotated by the motor 270, the circumferentially successive parts of the catalyst carrier are successively exposed to the air from the air inlet pipe 248 so that carbon and soot deposited on the walls of the axial passages in the catalyst carrier 252 are burnt to produce a carbon monoxide or carbon dioxide which is discharged from the housing 242 through a passage 274 into the intake pipe 112 of the engine 100 at a postion of the intake pipe downstream of the throttle valve 115.

In operation, it is preferred that the rich air-fuel mixture produced in the venturi 206 be richer than an air-fuel mixture normally used in an internal combustion engine. The air-fuel ratio of the rich air-fuel mixture is most preferably 1 and preferably less than 5. The ratio of the flow of the rich air-fuel mixture into the burner 230 relative to the total flow of the rich air-fuel mixture may be varied by varying the ratio of the cross-sectional areas of the burner 230 and the annular passage 236 and preferably from 10 to 20%. The rich air-fuel mixture supplied into the burner 230 is diluted to an air-fuel ratio of about from 10 to 15 by the secondary air supplied by the secondary air supply pipe 238 and is ignited by the spark plug 232 and bunt in the burner 230.

The unburnt rich air-fuel mixture passed through the annular passage 236 and the combustion gas produced in the burner 230 are mixed in the mixing chamber 240 to form the composite mixture. In a certain case, the hydrocarbon fuel contained in the composite mixture is partially oxidized by a very small amount of oxygen contained in the rich air-fuel mixture. The catalyst carrier 258 is heated by the heat of the combustion gas normally to a temperature of from 600° to 900° C. The composite mixture is converted and reformed into the reformed gaseous mixture which contains a large amount of hydrogen (about 5% by weight). The rate of the conversion and reformation greatly depends upon the kinds of catalysts, reaction temperature, the air-fuel ratio of the air-fuel mixture supplied, and so on. As an example, an air-fuel mixture of an air-fuel ratio of 3 was subjected to a reforming reaction at a reaction temperature of 800° C. and with a Ni catalyst to effectively produce a reformed gaseous mixture the hydrogen content of which amounted substantially to 5% by weight. In the illustrated embodiment of the invention, the heat exchanger 220 is preferably employed to more stably atomize the fuel for thereby stably supplying a composite mixture to the heated catalyst carrier. The heat exchanger is not essential for the invention and the fuel reforming system 200 from which the heat exchanger is removed will effectively be operative to produce a reformed gaseous mixture rich with hydrogen. The reformed gaseous mixture thus converted from the composite mixture is discharged from the housing 242 through the passage 272 into the intake pipe 112 of the engine 100.

Circumferentially successive portions of the disc-like catalyst carrier is successively exposed at about 800° C. to the air from the air inlet pipe 248 so that carbon produced and deposited on the successive portions of the catalyst carrier during their travel across the mixing chamber is oxidized or burnt to produce a combustion gas which is discharged from the housing 242 through the passage 274 into the intake pipe 112 of the engine 100. As such, the carbon deposite on the catalyst carrier is effectively removed therefrom by virtue of the combustion reaction of the carbon and oxygen contained in the air supplied through the air inlet pipe 248. By this combustion reaction, the successive portions of the catalyst carrier are heated and kept at an elevated temperature. Thus, the supply of air from the air inlet pipe 248 to the successive portions of the catalyst carrier by no means adversely affects the fuel reforming reaction on these portions of the catalyst carrier. The reformed gaseous mixture from the passage 272 and the combustion gas from the passage 274 are mixed in the intake pipe 112 with the flow of air supplied from the air cleaner 113 to form a composite mixture. The flap valve 115 is operative to control the rate of supply of air into the engine so that the composite mixture thus produced is of an air-fuel ratio appropriate for ignition in the engine 100 by a spark plug (not shown). The composite mixture is ignitable and combustible even at such a very large (lean) air-fuel ratio that a mixture of air and a hydrocarbon fuel (i.e., non-reformed fuel) produced by a conventional carburetor at the same air-fuel ratio is by no means ignitable and combustible, whereby the fuel reforming system 200 is operative to effectively reduce the emission of the three harmful components of the engine exhaust gas, i.e., HC, CO and $NO_x$.

Figure 10:
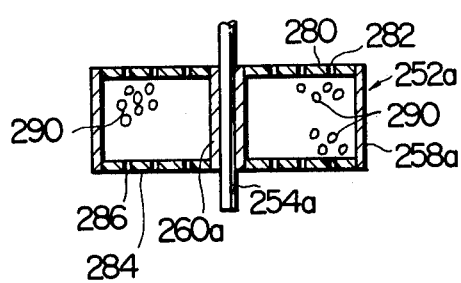
FIGS. 10 and 11 are axial and cross-sectional views of a modified catalyst carrier.
Figure 11:
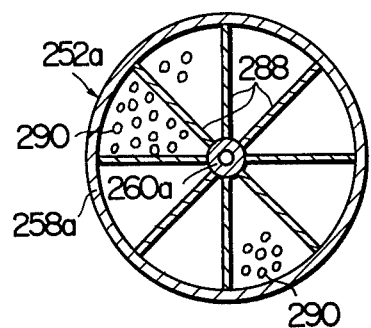

FIGS. 10 and 11 illustrate a modification of the catalyst carrier 252 of the honeycomb structure. The modified catalyst carrier is generally designated by 252a comprises a hollow cylindrical member 258a and a pair of generally disc-like end plates 280 and 284 which are formed therein with small apertures or perforations 282 and 286, respectively. An axle 254a is rigidly secured to the catalyst carrier 252a by means of a central reinforcement 260a extending between the end plates 280 and 284. The interior of the catalyst carrier 252a is divided by radial partitions 288 into a plurality of sectoral sections each of which is filled with catalyst particles 290.

Figure 12:
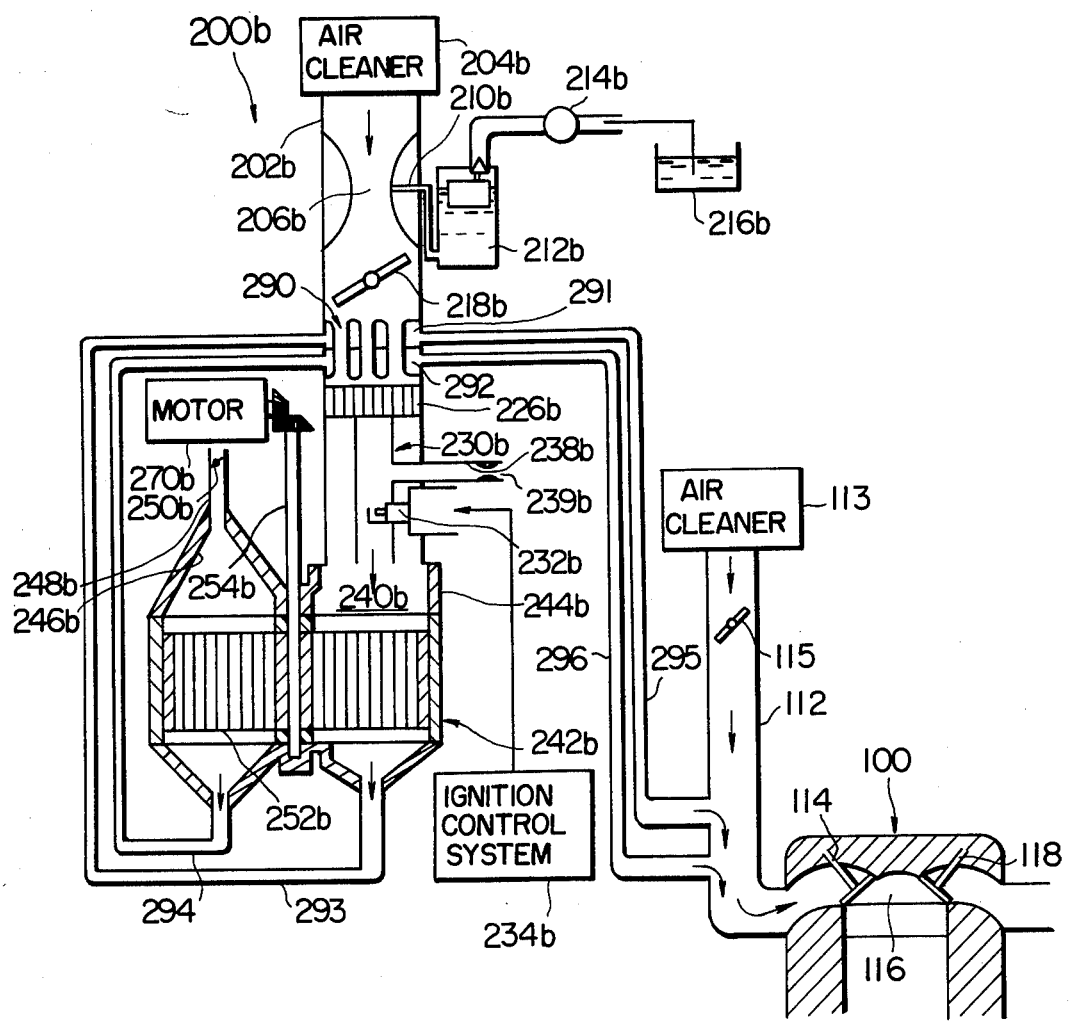
FIG. 12 is a diagrammatic illustration of a sixth embodiment of the invention.

FIG. 12 illustrates a sixth embodiment of the invention generally indicated by 200b. The sixth embodiment 200b are substantially similar in part to the fifth embodiment 200 shown in FIGS. 7 to 9. Similar parts of the sixth embodiment are indicated by similar reference numerals followed by a character "b". The difference only will be described hereunder. A heat exchanger unit 290 comprises a pair of heat exchangers 291 and 292 disposed in an intake pipe 202b downstream of a throttle valve 218b. Each of the heat exchangers 291 and 292 may be similar in construction to the heat exchanger 220 of the fifth embodiment 200 but smaller than that. A pipe line 293 for a reformed gaeous mixture produced in a housing 242b and a pipe line 294 for a combustion gas also produced therein extend from the housing 242b to the heat exchangers 291 and 291, respectively, so that the reformed gaseous mixture and the combustion gas are introduced both at high temperatures into the heat-exchanger unit 290 and flow therethrough into discharge pipe lines 295 and 296 and thus into an intake pipe 112 of an engine 100 so that an air-fuel mixture produced in a venturi 206b is effectively heated when it passes through the heat exchanger unit 290.

Compared with the fifth embodiment of the invention 200, the sixth embodiment 200b will be advantageous in that the reformed gaseous mixture and the combustion gas produced in the housing 242b are introduced into the engine 100 after having been cooled in the heat exchanger unit 290 by the air-fuel mixture passing therethrough thereby to improve the efficiency of charge and thus the engine output.

The illustrated sixth embodiment 200b comprises a pair of heat exchangers. This, however, is not essential for the invention. The reformed gaseous mixture and the combustion gas produced in the housing 242b may be mixed together and then introduced into a single heat exchanger (not shown) disposed in the intake pipe 202b downstream of the throttle valve 218b. Further alternatively, one of the reformed gaseous mixture and the combustion gas produced in the housing 242b may be directly fed into the intake pipe 112 of the engine while the other may be introduced into such a single heat exchanger to heat the air-fuel mixture produced in the venturi 206b. In this alternative case, it is preferred that the reformed gaseous mixture be supplied to the heat exchanger and cooled therein.

It is to be noted that the heat exchanger unit 290 of the sixth embodiment is not essential for the embodiment. A fuel reforming system without the heat exchange unit 290 will be operative to produce a reformed gaseous mixture because a part of the air-fuel mixture produced in the venturi 206b is burnt in the burner 230b to heat the remainder of the mixture.

In the embodiments described, the combustion gas produced by the combustion of carbon deposited on the catalyst carrier is ultimately fed into an associated internal combustion engine. However, an excess air may be supplied to the carbon deposite to completely convert the carbon into carbon dioxide which may then be discharged through an engine exchaust pipe into the atmosphere.

The burners 230 and 230b may be operated only during the time while the catalyst carriers 242 and 242b are heated to a predetermined temperature. After the catalyst carriers are so heated, they may be supplied with fuel only (i.e., not an air-fuel mixture) so that the fuel is thermally decomposed. Soot or carbon produced during the thermal decomposition of the fuel may advantageously be burnt by oxigen contained in the air supplied from air inlet pipes 248 and 248b to produce heat which can effectively be utilized to heat the catalyst carriers 252 and 252b. In this case, a fuel injection system rather than a carburetor is preferably used.

The internal combustion engine 100 associated with the embodiments of the invention has been described as being operated with a composite mixture of reformed gaseous mixture from the fuel reforming system and air from the air cleaner 113. A carburetor (not shown) may be provided in the intake pipe 112 of the engine 100 so that non-reformed hydrocarbon fuel is mixed with the composite mixture at a rate determined dependent on the operating conditions of the engine.

In each of the illustrated fifth and sixth embodiments 200 and 200b of the invention, when the temperature of the engine exhaust gas, the reformed gaseous mixture discharged from the housing 242b or the combustion gas discharged from the housing becomes high enough to vaporize the air-fuel mixture produced in the venturi 206 or 206b sufficiently for the reforming reaction thereof in the housing 242 or 242b, the secondary air supply restricter 239 or 239b may be closed to stop the combustion of a part of the air-fuel mixture in the burner 230 or 230b with a stable and efficient fuel reforming reaction in the housing 242 or 242b. In addition, a heater (not shown) may be provided in the air inlet pipe 248 or 248b to heat air to be supplied to successive portions of the catalyst carrier 252 or 252b to remove carbon therefrom so that the removal of the carbon is improved.

The invention described above provides the following advantages:

(1) A part of a hydrocarbon fuel to be supplied into an internal combustion engine is burnt in a burner to produce heat by which the remainder of the fuel to be supplied to a fuel reforming reactor vessel or housing is substantially perfectly vaporized;

(2) The fuel reforming reactor vessel or housing contains a catalyst therein and is supplied with the remainder of fuel so that the fuel is converted into a reformed gaseous mixture rich with hydrogen;

(3) The catalyst in the fuel reforming reactor vessel or housing is periodically or alternately exposed to the remainder of fuel for the conversion and reformation thereof into the reformed gaseous mixture and to air for the combustion reaction of the air with carbon produced and deposited on the catalyst during the preceding fuel reforming reaction so that the carbon is burnt away from the catalyst to restore the performance of the catalyst;

(4) A tar separator is disposed downstream of the fuel reforming reactor vessel or housing in an embodiment of the invention to effectively remove tar component from the reformed gaseous mixture whereby the distribution of the reformed gaseous mixture is advantageously improved; and (5) The supply of the reformed gaseous mixture rich with hydrogen to the internal combustion engine assures the engine operation with an air-fuel mixture which is of such a very large (lean) air-fuel ratio that a mixture of air and a normal fuel produced by a carburetor at the same air-fuel ratio is not ignitable by a spark plug and burnt in the engine, whereby the emission of harmful HC, CO and $NO_x$ can advantageously be reduced.

Figure 13:
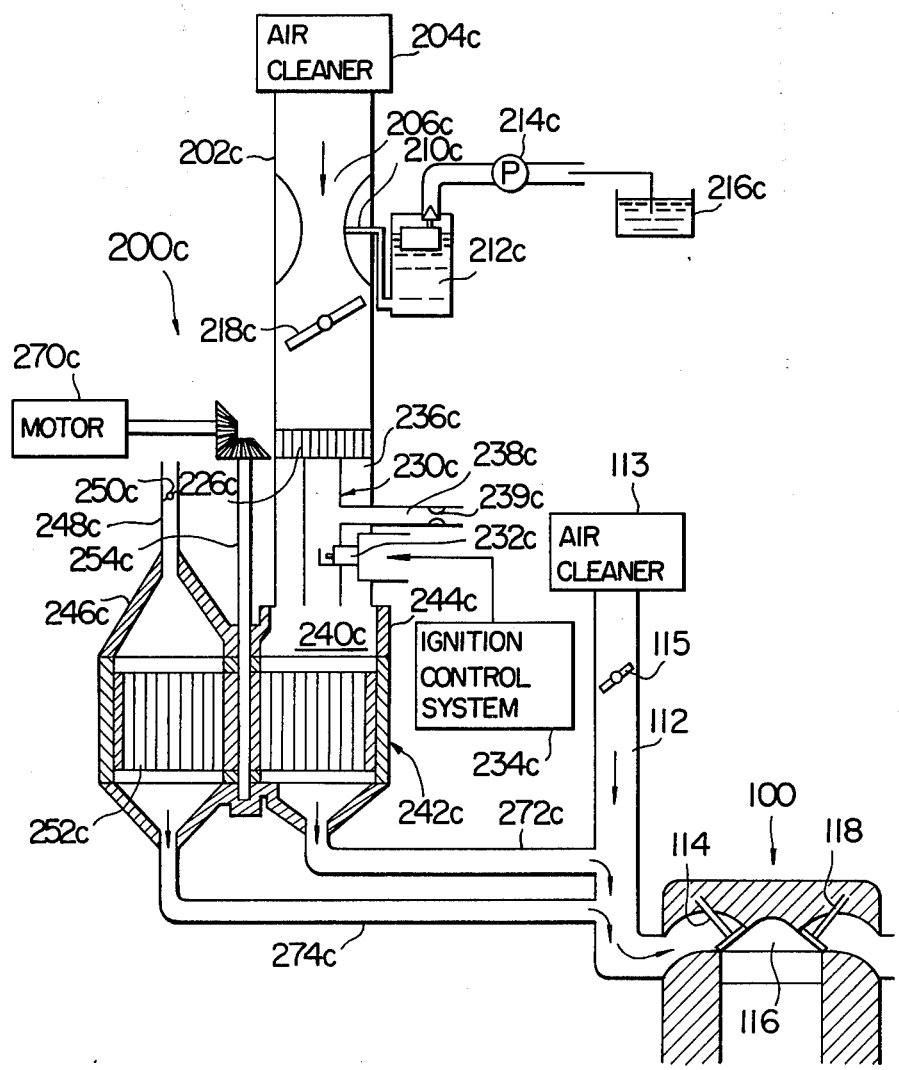
FIG. 13 is a similar illustration of a seventh embodiment of the invention.

FIG. 13 illustrates a seventh embodiment of the invention generally designated by 200c. The seventh embodiment is substantially similar in construction and operation to the fifth embodiment 200 shown in FIG. 7 with the exception that the seventh embodiment 200c does not have a heat exchanger for heating an air-fuel mixture before it is fed to a fuel reforming reactor. Thus, it will be sufficient to make a reference that the parts of the seventh embodiment 200c similar to the corresponding parts of the fifth embodiment 200 are indicated by similar reference numerals followed by a character "c".

What is claimed is:

1. A fuel reforming system for an internal combustion engine, which includes a combustion chamber, an air cleaner, and an intake pipe operatively communicating said air cleaner with said combustion chamber via an intake valve for feeding air therethrough, comprising:

a burning chamber for burning a mixture of fuel and air therein to thereby produce a combustion gas of a high temperature;

a first air conduit operatively communicating said intake pipe with said burning chamber for supplying air thereto from said air cleaner;

a fuel tank for storing a hydrocarbon fuel;

a first fuel conduit operatively communicating said fuel tank with said burning chamber for supplying the fuel thereto;

igniting means disposed in said burning chamber for igniting and burning the mixture of air and fuel respectively supplied from said first air and fuel conduits;

a heat exchanging chamber communicated with said burning chamber at its upstream end and also communicated with said intake pipe at its downstream end for allowing said combustion gas to flow from said burning chamber to said intake pipe through said heat exchanging chamber;

fuel reforming reactor means disposed in said heat exchanging chamber and having a catalyst therein for reforming a fuel into a reformed gaseous mixture including hydrogen, said fuel reforming reactor means being heated by said combustion gas flowing through said heat exchanging chamber, and said fuel reforming reactor means being communicated with said intake pipe for supplying the reformed gaseous mixture to said engine;

a second fuel conduit operatively communicating said fuel tank with said fuel reforming reactor means through a fuel control valve for supplying a fuel thereto for causing the catalytic reforming reactor of said fuel in said fuel reforming reactor means;

a control circuit for periodically actuating said fuel control valve to open said second fuel conduit; and a second air conduit operatively communicated with said fuel reforming reactor means through an air control valve for supplying air thereto;

said control circuit also periodically actuating said air control valve to open said second air conduit during a time when said second fuel conduit is closed by said control circuit, whereby when said fuel reforming reactor means is supplied with the air, a combustion reaction is caused between the air and carbon produced by said reforming reaction and deposited on the surface of said catalyst to thereby remove said carbon therefrom.

2. A fuel reforming system for an internal combustion engine, which includes a combustion chamber, an air cleaner, and an intake pipe operatively communicating said air cleaner with said combustion chamber via an intake valve for feeding air therethrough, comprising:

a burning chamber for burning a mixture of fuel and air therein to thereby produce a combustion gas of a high temperature;

a first air conduit operatively communicated with said burning chamber for supplying air thereto;

a fuel tank for storing a hydrocarbon fuel;

a first fuel conduit operatively communicating said fuel tank with said burning chamber for supplying the fuel thereto;

igniting means disposed in said burning chamber for igniting and burning the mixture of air and fuel respectively supplied from said first air and fuel conduits;

a heat exchanging chamber communicated with said burning chamber at its upstream end and also communicated with said intake pipe at its downstream end for allowing said combustion gas to flow from said burning chamber to said intake pipe through said heat exchanging chamber;

first and second fuel reforming reactor vessels disposed in said heat exchanging chamber and each having a catalyst therein for reforming a fuel into a reformed gaseous mixture including hydrogen, said first and second fuel reforming reactor vessels being heated by said combustion gas flowing through said heat exchanging chamber, and said fuel reforming reactor vessel being communicated with said intake pipe for supplying the reformed gaseous mixture to said engine;

a second fuel conduit means alternately communicating said fuel tank with said first and second fuel reforming reactor vessels through a fuel control valve for supplying a fuel thereto for causing the catalytic reforming reaction of said fuel in said fuel reforming reactor vessels;

a control circuit for periodically actuating said fuel control valve to perform the alternate communication of said fuel tank with said first and second fuel reforming reactor vessels; and a second air conduit means alternately communicated with said first and second fuel reforming reactor vessels through an air control valve for supplying air thereto;

said control circuit actuating said air control valve in such a manner that said second air conduit means supplies the air to one of said first and second fuel reforming reactor vessels during a time when the supply of the fuel to said one of first and second fuel reforming reactor vessels from said second fuel conduit means is stopped, whereby when said one of said fuel reforming reactor vessels is supplied with the air, a combustion reaction is caused in said one of fuel reforming reactor vessels between the air and carbon produced by said reforming reaction and deposited on the surface of said catalyst to thereby remove said carbon therefrom.

3. A fuel reforming system for an internal combustion engine, which includes a combustion chamber, an air cleaner, and an intake pipe operatively communicating said air cleaner with said combustion chamber via an intake valve for feeding air therethrough, comprising:

a burning chamber for burning a mixture of fuel and air therein to thereby produce a combustion gas of a high temperature;

a first air conduit operatively communicated with said burning chamber for supplying air thereto;

a fuel tank for storing a hydrocarbon fuel;

a first fuel conduit operatively communicating said fuel tank with said burning chamber for supplying the fuel thereto;

igniting means disposed in said burning chamber for igniting and burning the mixture of air and fuel respectively supplied from said first air and fuel conduits;

a heat exchanging chamber communicated with said burning chamber at its upstream end and also communicated with said intake pipe at its downstream end for allowing said combustion gas to flow from said burning chamber to said intake pipe through said heat exchanging chamber;

fuel reforming reactor means disposed in said heat exchanging chamber and having a catalyst therein for reforming a fuel into a reformed gaseous mixture including hydrogen, said fuel reforming reactor means being heated by said combustion gas flowing through said heat exchanging chamber, and said fuel reforming reactor means being communicated with said intake pipe for supplying the reformed gaseous mixture to said engine;

a second fuel conduit operatively communicating said fuel tank with said fuel reforming reactor means through a fuel control valve for supplying a fuel thereto for causing the catalytic reforming reaction of said fuel in said fuel reforming reactor means;

a control circuit for actuating said fuel control valve to open said second fuel conduit; and a second air conduit operatively communicated with said fuel reforming reactor means through an air control valve for supplying air thereto;

said control circuit also actuating said air control valve to open said second air conduit during a time when said second fuel conduit is closed by said control circuit, whereby when said fuel reforming reactor means is supplied with the air, a combustion reaction is caused between the air and carbon produced by said reforming reaction and deposited on the surface of said catalyst to thereby remove said carbon therefrom.

4. A fuel reforming system as claimed in claim 5, further comprising a spiral fuel passage connected between said fuel reforming reactor means and said second fuel conduit downstream of said fuel control valve for passing the fuel to said fuel reforming reactor means therethrough, said spiral fuel passage being disposed in said heat exchanging chamber so that said passage is heated by said combustion gas to vaporize said fuel flowing therethrough.

5. A fuel reforming system as claimed in claim 3, further comprising:

an air-flow meter mounted on said intake pipe for detecting the flow of air supplied to said engine and generating an electrical signal representing said flow of air;

a fuel metering valve disposed in said first fuel conduit for closing and opening the same; and control means electrically connected to both of said air-flow meter and fuel metering valve for actuating said fuel metering valve to close and open said first fuel conduit in response to said electrical signal, whereby the amount of the fuel supplied to said burning chamber is controlled in response to the flow of air.

6. A fuel reforming system as claimed in claim 3, further comprising:

temperature detecting means mounted on said fuel reforming reactor means for detecting the temperature thereof and producing an electrical signal representing said temperature of said fuel reforming reactor means;

an air metering valve disposed in said first air conduit for closing and opening the same; and control means electrically connected to both of said temperature detecting means and air metering valve for actuating said air metering valve to close said first air conduit when the temperature of said fuel reforming reactor means exceeds a predetermined value, whereby when said first air conduit is closed the supply of air to said burning chamber is stopped with the result that the burning of the mixture in said burning chamber is prevented.

7. A fuel reforming system as claimed in claim 3, further comprising;

an air-flow meter mounted on said intake pipe for detecting the flow of air supplied to said engine and generating an electrical signal representing said flow of air;

a fuel metering valve disposed in said second fuel conduit for closing and opening the same; and control means electrically connected to both of said air-flow meter and fuel metering valve for actuating said fuel metering valve to close and open said second fuel conduit in response to said electrical signal, whereby the amount of the fuel supplied to said fuel reforming reactor means is controlled in response to the flow of air.

8. A fuel reforming system for an internal combustion engine, which includes a combustion chamber, an air cleaner, and an intake pipe operatively communicating said air cleaner with said combustion chamber via an intake valve for feeding air therethrough, comprising:

means for producing an air-fuel mixture;

a burning chamber disposed downstream of said mixture producing means for burning the mixture to thereby produce a combustion gas of a high temperature;

igniting means disposed in said burning chamber for igniting and burning the mixture;

a heat exchanging chamber communicated with said burning chamber at its upstream end and also communicated with said intake pipe at its downstream end for allowing said combustion gas to flow from said burning chamber to said intake pipe through said heat exchanging chamber;

fuel reforming reactor means disposed in said heat exchanging chamber and having a catalyst therein for reforming a fuel into a reformed gaseous mixture including hydrogen, said fuel reforming reactor means being heated by said combustion gas flowing through said heat exchanging chamber, and said fuel reforming reactor means being communicated with said intake pipe for supplying the reformed gaseous mixture to said engine;

means for supplying a fuel to said fuel reforming reactor means for a predetermined time period during engine operation for causing the catalytic reforming reaction of said fuel in said fuel reforming reactor means; and means for supplying air to said fuel reforming reactor means during other than said predetermined time period for reoccurringly causing a combustion reaction between the air and carbon produced by said reforming reaction and deposited on the surface of said catalyst for removing said carbon therefrom.

9. A fuel reforming system as claimed in claim 8, wherein said fuel supplying means comprises a passage disposed around said burning chamber and communicating said mixture producing means with said fuel reforming reactor means.

10. A fuel reforming system as claimed in claim 9 further comprising heat exchange means disposed between said mixture producing means and said burning chamber for causing heat exchange between an exhaust gas from the engine and the fuel supplied to said fuel reforming reactor means to thereby heat and vaporize said fuel passing through said fuel supplying means.

11. A fuel reforming system as claimed in claim 9 further comprising heat exchange means disposed between said mixture producing means and said burning chamber for causing heat exchange between said reformed gaseous mixture from said fuel reforming reactor means and the fuel supplied to said reactor means through said fuel supplying means to thereby heat and vaporize said fuel.

12. A fuel reforming system as claimed in claim 9 further comprising means disposed downstream of said fuel supplying means and said burning chamber for mixing said combustion gas with the fuel from said fuel supplying means.

13. A fuel reforming system for an internal combustion engine, which includes a combustion chamber, an air cleaner, and an intake pipe operatively communicating said air cleaner with said combustion chamber via an intake valve for feeding air therethrough, comprising:

a burning chamber for burning a mixture of fuel and air therein to thereby produce a combustion gas of a high temperature;

a first air conduit operatively communicated with said burning chamber for supplying air thereto;

a fuel tank for storing a hydrocarbon fuel;

a first fuel conduit operatively communicating said fuel tank with said burning chamber for supplying the fuel thereto;

igniting means disposed in said burning chamber for igniting and burning the mixture of air and fuel respectively supplied from said first air and fuel conduits;

a heat exchanging chamber communicated with said burning chamber at its upstream end and also communicated with said intake pipe at its downstream end for allowing said combustion gas to flow from said burning chamber to said intake pipe through said heat exchanging chamber;

first and second fuel reforming reactor vessels disposed in said heat exchanging chamber and each having a catalyst therein for reforming a fuel into a reformed gaseous mixture including hydrogen, said first and second fuel reforming reactor vessels being heated by said combustion gas flowing through said heat exchanging chamber, and said fuel reforming reactor vessels being communicated with said intake pipe for supplying the reformed gaseous mixture to said engine;

a second fuel conduit connected at one end with said fuel tank for supplying the fuel therefrom;

first and second fuel branches respectively connected at each one end with said first and second fuel reforming reactor vessels;

a fuel three-way valve connected between the other end of said second fuel conduit and the respective other ends of said first and second fuel branches for communicating said second fuel conduit with one of said first and second fuel branches;

a control circuit periodically actuating said fuel three-way valve for alternately communicating said second fuel conduit with said first and second fuel branches, to thereby alternately supply the fuel to said first and second fuel reforming reactor vessels for causing the catalytic reforming reaction of said fuel therein;

a second air conduit for supplying air therethrough;

first and second air branches respectively connected at each one end with said first and second fuel reforming reactor vessels; and an air three-way valve connected between said second air conduit and the respective other ends of said first and second air branches for communicating said second air conduit with one of said first and second air branches;

said control circuit also periodically actuating said air three-way valve for alternately communicating said second air conduit with said first and second air branches in such a manner that said second air conduit supplies the air to one of said first and second fuel reforming reactor vessels through the corresponding air branch during a time when the supply of the fuel to said one of first and second fuel reforming reactor vessels through the corresponding fuel branch from said second fuel conduit is stopped, whereby when said one of said fuel reforming reactor vessels is supplied with the air, a combustion reaction is caused in said one of said fuel reforming reactor vessels between the air and carbon produced by reforming reaction and deposited on the surface of said catalyst to thereby remove said carbon therefrom.

14. A fuel reforming system as claimed in claim 13, further comprising first and second spiral fuel passages respectively connected between said first and second fuel reforming reactor vessels and said first and second fuel branches downstream of said fuel three-way valve for passing the fuel to said fuel reforming reactor vessels therethrough, both of said spiral fuel passages being disposed in said heat exchanging chamber so that said passages are heated by said combustion gas to vaporize said fuel flowing therethrough.

15. A fuel reforming system as claimed in claim 13, further comprising:
an air-flow meter mounted on said intake pipe for detecting the flow of air supplied to said engine and generating an electrical signal representing said flow of air;
a fuel metering valve disposed in said first fuel conduit for closing and opening the same; and
control means electrically connected to both of said air-flow meter and fuel metering valve for actuating said fuel metering valve to close and open said first fuel conduit in response to said electrical signal, whereby the amount of the fuel supplied to said burning chamber is controlled in response to the flow of air.

16. A fuel reforming system as claimed in claim 13, further comprising:
temperature detecting means mounted on at least one of said fuel reforming reactor vessels for detecting the temperature thereof and producing an electrical signal representing said temperature of said fuel reforming reactor vessel;
an air metering valve disposed in said first air conduit for closing and opening the same; and
control means electrically connected to both of said temperature detecting means and air metering valve for actuating said air metering valve to close said first air conduit when the temperature of said fuel reforming reactor vessel exceeds a predetermined value, whereby when said first air conduit is closed the supply of air to said burning chamber is stopped with the result that the burning of the mixture in said burning chamber is prevented.

17. A fuel reforming system as claimed in claim 13, further comprising;
an air-flow meter mounted on said intake pipe for detecting the flow of air supplied to said engine and generating an electrical signal representing said flow of air;
a fuel metering valve disposed in said second fuel conduit for closing and opening the same; and
control means electrically connected to both of said air-flow meter and fuel metering valve for actuating said fuel metering valve to close and open said second fuel conduit in response to said electrical signal, whereby the amount of the fuel supplied to said fuel reforming reactor vessels is controlled in response to the flow of air.

* * * * *